Dec. 22, 1953 A. ERNST Re. 23,755

APPARATUS FOR TESTING THE HARDNESS OF MATERIALS

Original Filed June 18, 1947

INVENTOR.
ALFRED ERNST

BY David J. Mossinghoff
his ATTORNEY

Reissued Dec. 22, 1953 Re. 23,755

UNITED STATES PATENT OFFICE 23,755

APPARATUS FOR TESTING THE HARDNESS OF MATERIALS

Alfred Ernst, Milan, Italy

Original No. 2,536,632, dated January 2, 1951, Serial No. 755,293, June 18, 1947. Application for reissue December 19, 1951, Serial No. 262,384. In Switzerland February 6, 1946

Section 1, Public Law 690, August 8, 1946
Patent expires February 6, 1966

9 Claims. (Cl. 73—81)

Matter enclosed in heavy brackets [ ] appears in the original patent but forms no part of this reissue specification; matter printed in italics indicates the additions made by reissue.

The present invention relates to apparatus for testing the hardness of materials and particularly materials such as steel and iron.

It is frequently the case that such testing requires apparatus which is particularly complicated, and can be carried out only in a laboratory and by competent specialists. However it is a need which is much felt by technicians and workers in metal to be able to submit metals rapidly and without special processes to examination and test as to hardness.

The object of the present invention is to provide apparatus for testing the hardness of materials, by means of which it is possible to test and ascertain the hardness of metals immediately, in situ, and by anyone. The apparatus for testing the hardness of materials according to the invention comprises a movable feeler fitted in a punch structure and furnished with a hard point which controls hydraulically a member which measures the depth of penetration of the feeler. The whole is so constructed that on compressing the structure upon the material to be tested, the feeler penetrates into the material itself, which enables the hardness to be determined by the measure of penetration indicated by a measuring or indicating device forming part of the apparatus.

In the accompanying drawings, a constructional form of the invention is illustrated by way of example only.

Figure 1:
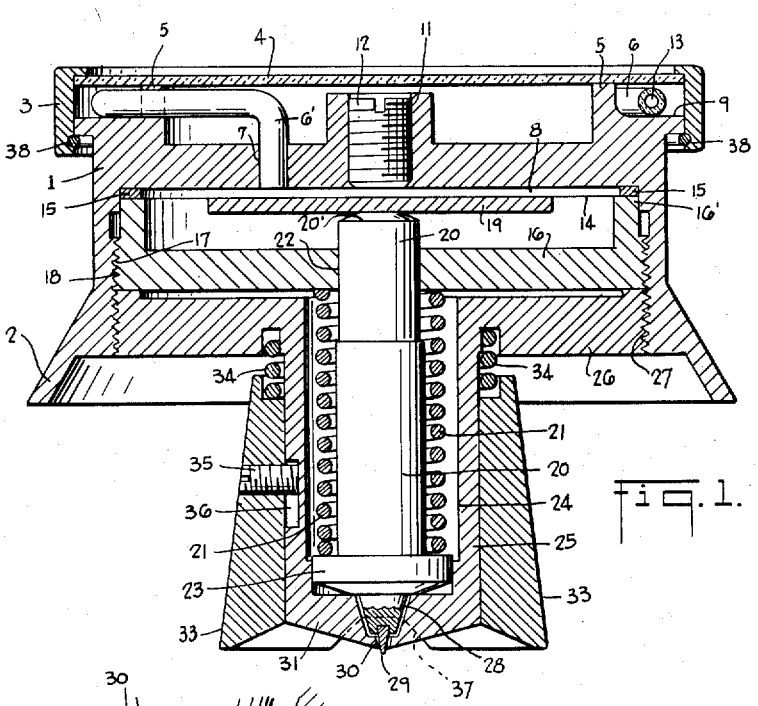
Fig. 1 is a vertical section of the apparatus.

In the drawing, 1 indicates a cylindrical casing which is provided with a flange on which is fitted an outer cover ring 3 of greater diameter, which thus projects outwardly, and is therefore easily gripped by the hand. The ring 3 engages over and surrounds a glass disc 4 which rests on the annular part 5 projecting at the top of the casing.

6 indicates a measuring or indicator tube made of glass and of circular form, having a terminal portion 6′ which opens through the hole 7, into the liquid chamber 8 of casing 1. The circular part of the measuring pipe rests on the annular part 9 of the casing 1. On the said annular part 9 is marked a scale 10. Obviously, if desired, a scale may be marked directly on the measuring tube 6. In a collar 11, at the centre of casing 1, is a screw 12, for regulating the liquid in chamber 8, and by adjustment of this screw the level of the measuring or indicating liquid in the chamber 8 and in the capillary bore 13 of the measuring tube 6 can be regulated.

14 indicates a diaphragm which closes the chamber 8, the said diaphragm being held between a retaining ring 15, arranged in the casing, and the rim 16′ of the intermediate disc 16. The latter is screwed into position with its external thread 17 engaged in the internal thread 18 of casing 1. The diaphragm 14 bears downwardly on the plate 19, which bears in its turn on the conical head 20′ of the stem 20 of the feeler.

The stem 20 of the mentioned feeler is, within certain limits, movable axially and is subject to the action of a helical spring 21, which surrounds the stem, and which tends to push this stem 20 downwardly. The stem 20 of the feeler is movably guided by passage through the hole 22 of the intermediate disc 16, and also by its enlarged collar portion or flange 23, which is movable axially in lower reduced portion of the bore 24 provided for the stem 20 in cylinder or sleeve 25.

The cylinder or sleeve 25 extends downwardly from, and is made in one piece with the closure disc 26 for casing 1. The disc 26 is screwed into position and engages by means of the thread 27 in the internal thread 18 of casing 1. The stem 20 of the feeler has a feeler extension 28, in the form of a truncated cone, in which is inserted a small diamond feeler point 29. The feeler extension 28 carrying the small diamond feeler point 29 fits into a correspondingly shaped recess 30 in the head 31 of cylinder or sleeve 25. The feeler thus consists of shank 20, head 20′, flange 23, extension 28 and point 29 which actually makes contact with the material to be tested.

Figure 2:
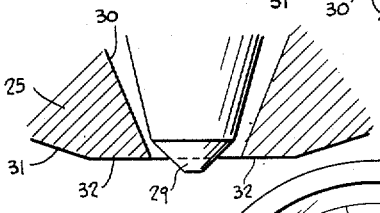
Fig. 2 shows, in fragmentary section, the feeler on a larger scale.
Figure 3:
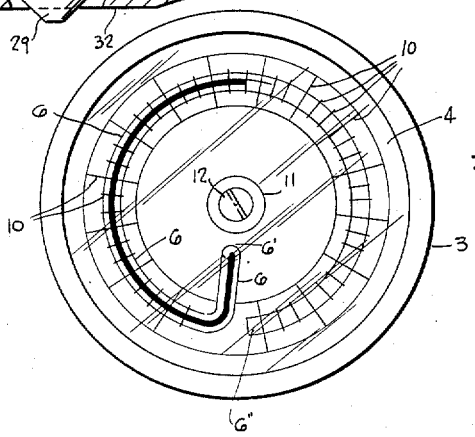
Fig. 3 is a plan view of the apparatus showing the indicator dial or face which indicates the pressure.

The small point 29 normally projects slightly beyond the cylinder plane 32 of the head 31, as seen in Fig. 2. On the outside of cylinder 25 is provided a sleeve 33, movable axially, which is pressed downwardly by means of the helical spring 34, which bears upwardly on the closure disc 26. 35 indicates a registering screw which is screwed into the sleeve 33, and has an inwardly projecting end which is engaged in the longitudinal slot 36, thus limiting the axial movement of the sleeve 33. In the normal position the frontal lower face of the sleeve 33 projects slightly in relation to the small diamond feeler point 29, so that the latter is protected against possible damage.

The frontal faces of the sleeve 33 and of the head 31 of the cylinder 25 which it surrounds are bevelled towards each other. The sleeve 33 has two slots 37 of V-shape to render it possible to apply the device to round bodies to be tested without danger of slipping. 38 indicates a retaining ring between the casing 1 and the cover 3.

To test the hardness of a metallic body the frontal face of the sleeve 33 of the apparatus just described is applied thereto, the hand being placed on the casing 1, in such manner that the fingers rest on the enlarged flange or apron 2, and downward pressure is applied. The small diamond feeler point, owing to its greater hardness is forced into the metal body subjected to test, and the stem 20 is moved more or less, according to the depth of penetration.

The movements are transmitted by the stem 20 both to the disc 19 and to the diaphragm 14, and from this to the liquid in the chamber 8 of the measuring tube 6. The testing of the hardness is effected immediately and as soon as pressure has been firmly applied, without requiring any special preparation of the body being tested. The casing 1, the intermediate disc 16, the disc 26 carrying the cylinder or sleeve 25, and the casing flange, virtually form a punch structure very easy to handle.

The device according to the invention is suitable for testing the hardness of all kinds of metals; and by reason of its small dimensions and its small weight it can be easily carried in the pocket.

The small feeler point 29 instead of being made of diamond can be of any other hard material, such as hard metal, etc.

Manifestly, variations may be resorted to and parts and features may be modified or used without others within the scope of the appended claims.

What is claimed is:

1. A compact testing device for testing the hardness of materials by surface penetration of the materials to be tested, including the combination, with a hollow casing having a downwardly directed opening, of a depending portion and an upper wide lateral portion on the casing; a plunger vertically movable in the casing and having a head adjacent to the lower end thereof slidably disposed in the depending portion, the upper lateral portion of the casing having a guide hole through which the upper end of the plunger extends slidably; an expansion coil spring mounted on the plunger in effective position to rest with its lower end on the head and engage with its upper end against the upper lateral portion of said casing; a hard*ness* testing element fixed on the bottom of the head of said plunger and normally projecting down through said opening; the casing having a first wide lateral chamber extending transversely of the plunger and a second wide and shallow chamber overlying the first chamber for containing a fluid; a diaphragm forming a lateral flexible partition separating the two chambers; intermediate reinforcing means on the diaphragm, the upper end of said plunger abutting the reinforcing means on said diaphragm from beneath; a cover mounted on the upper portion of said casing and having a transparent top forming a window; and a capillary tube arched into a partial loop with [a closed end and] *one end* lying on the casing beneath the transparent top or window of the cover, with the other end of said capillary tube extending down into direct communication with the second chamber in said casing, and said casing having a series of indicia adjacent to said capillary tube beneath the window of said cover.

2. A compact testing device for testing the hardness of materials by surface penetration of the materials to be tested, including the combination, with a hollow casing having a downwardly directed opening, of a depending cylindrical portion and an upper wide lateral portion on the casing; a plunger vertically movable in the casing and having a head adjacent to the lower end thereof slidably disposed in the depending cylindrical portion, the upper lateral portion of the casing having a guide hole through which the upper end of the plunger extends slidably; an expansion coil spring mounted on the plunger in effective position to rest with its lower end on the head and engage with its upper end against the upper lateral portion of said casing; a hard*ness* testing element fixed on the bottom of the head of said plunger and normally projecting down through said opening; the casing having a first wide lateral chamber extending transversely of the plunger and a second wide and shallow chamber overlying the first chamber for containing a fluid; a diaphragm forming a lateral flexible partition separating the two chambers; intermediate reinforcing means on the diaphragm, the upper end of said plunger abutting the reinforcing means on said diaphragm from beneath; a hollow protecting guard slidably mounted on said depending cylindrical portion of the casing; means limiting the sliding movement of the hollow protecting guard to a low position in which the lower end projects down beyond the lower extension of said hardness testing element and an upper position in which said hard*ness* testing element projects down to exposed operative position; a spring disposed between the upper portion of said casing and said protecting guard for biasing the latter normally into its low position; a cover mounted on the upper portion of said casing and having a transparent top forming a window; and a capillary tube arched into a partial loop with [a closed end and] *one end* lying on the casing beneath the transparent top or window of the cover, with the other end of said capillary tube extending down into direct communication with the second chamber in said casing, and said casing having a series of indicia adjacent to said capillary tube beneath the window of said cover.

3. A compact testing device for testing the hardness of materials by surface penetration of the materials to be tested, including the combination, with a hollow casing having a downwardly directed opening, of a plunger vertically slidable in the casing; a hard*ness* testing element secured to the lower end of the plunger and normally projecting down through said opening; a spring in the casing biasing the plunger downward toward said opening, the casing having a first wide lateral chamber extending transversely of the plunger and a second wide and shallow chamber overlying the first chamber for containing a fluid; a diaphragm forming a lateral flexible partition separating the two chambers; a lateral reinforcing plate secured to the underside of the intermediate portion of the diaphragm, the upper end of the plunger extending up into the first chamber and making operative contact with said reinforcing plate from beneath for moving said diaphragm; a cover mounted on the upper portion of said casing and having a transparent top forming a window; a capillary tube arched into a partial loop with [a closed end and] *one end* lying on the casing beneath the transparent top or window of the cover, with the other end of said capillary tube extending down into direct communication with the second chamber in said casing, and said casing having a series of indicia adjacent to said capillary tube beneath the window of said cover; and slidably movable means for normally protecting said hardness testing element from accidental contact with various objects.

4. A compact testing device for testing the hardness of materials by surface penetration of the materials to be tested, including the combination, with a hollow casing having a downwardly directed opening, of a depending portion and an upper wide lateral portion on the casing; a plunger vertically movable in the casing and having a head adjacent to the lower end thereof slidably disposed in the depending portion, the upper lateral portion of the casing having a guide hole through which the upper end of the plunger extends slidably; an expansion coil spring mounted on the plunger in effective position to rest with its lower end on the head and engage with its upper end against the upper lateral portion of said casing; a hardness testing element fixed on the bottom of the head of said plunger and normally projecting down through said opening; the casing having a first wide lateral chamber extending transversely of the plunger and a second wide and shallow chamber overlying the first chamber for containing a fluid; a diaphragm forming a lateral flexible partitation separating the two chambers; a lateral reinforcing plate secured to the underside of the intermediate portion of the diaphragm, the upper end of the plunger extending up into the first chamber into effective contact with said reinforcing plate from beneath for moving said diaphragm; a cover mounted on the upper portion of said casing and having a transparent top forming a window; a capillary tube arched into a partial loop with [a closed end and] *one end* lying on the casing beneath the transparent top or window of the cover, with the other end of said capillary tube extending down into direct communication with the second chamber in said casing, and said casing having a series of indicia adjacent to said capillary tube beneath the window of said cover; and slidably movable means for normally protecting said hardness testing element from accidental contact with various objects.

*5. A compact testing device for testing the hardness of materials by surface penetration of the materials to be tested, including the combination, with a hollow casing having a downwardly directed opening, of a depending portion and an upper wide lateral portion on the casing, a plunger vertically movable in the casing and slidably disposed in the depending portion, the upper lateral portion of the casing having a guide hole through which the upper end of the plunger extends slidably, an expansion coil spring mounted on the plunger in effective position to engage the plunger with its lower end and engage with its upper end against the upper lateral portion of said casing, a hardness testing element fixed on the bottom of said plunger and normally projecting down through said opening, the casing having a first wide lateral chamber extending transversely to the plunger and a second wide and shallow chamber overlying the first chamber for containing a fluid, a diaphragm forming a lateral flexible partition separating the two chambers, intermediate reinforcing means on the diaphragm, the upper end of said plunger abutting the reinforcing means on said diaphragm from beneath, a cover mounted on the upper portion of said casing and having a transparent top forming a window, and a capillary tube arched into a partial loop with one end lying on the casing beneath the transparent top or window of the cover, with the other end of said capillary tube extending down into direct communication with the second chamber in said casing and said casing having a series of indicia adjacent to said capillary tube beneath the window of said cover.*

*6. A compact testing device for testing the hardness of materials by surface penetration of the materials to be tested, including the combination, with a hollow casing having a downwardly directed opening, of a depending cylindrical portion and an upper wide lateral portion on the casing, a plunger vertically movable in the casing and slidably disposed in the depending cylindrical portion, the upper lateral portion of the casing having a guide hole through which the upper end of the plunger extends slidably, an expansion coil spring mounted on the plunger in effective position to engage the plunger with its lower end and engage with its upper end against the upper lateral portion of said casing, a hardness testing element fixed on the bottom of said plunger and normally projecting down through said opening, the casing having a first wide lateral chamber extending transversely of the plunger and a second wide and shallow chamber overlying the first chamber for containing a fluid, a diaphragm forming a lateral flexible partition separating the two chambers, intermediate reinforcing means on the diaphragm, the upper end of said plunger abutting the reinforcing means on said diaphragm from beneath, a hollow protecting guard slidably mounted on said depending cylindrical portion of the casing, means limiting the sliding movement of the hollow protecting guard to a low position in which the lower end projects down beyond the lower extension of said hardness testing element and an upper position in which said hardness testing element projects down to exposed operative position, a spring disposed between the upper portion of said casing and said protecting guard for biasing the latter normally into its low position, a cover mounted on the upper portion of said casing and having a transparent top forming a window, and a capillary tube arched into a partial loop with one end lying on the casing beneath the transparent top or window of the cover, with the other end of said capillary tube extending down into direct communication with the second chamber in said casing, and said casing having a series of indicia adjacent to said capillary tube beneath the window of said cover.*

*7. A compact testing device for testing the hardness of materials by surface penetration of the materials, including the combination with a sleeve, a hollow casing slidable in said sleeve and having a hollow depending portion provided with a downwardly directed opening, of a plunger vertically slidable in the depending portion of the casing, a hardness testing element secured to the lower end of the plunger and normally projecting through said opening, resilient means in said casing operatively connected with said plunger for biasing said plunger towards said opening, a*

*chamber for a liquid body formed within the casing and having a flexible diaphragm as a lower wall thereof, said diaphragm being disposed in proximity to the upper end of said plunger and adapted to be deformed by said plunger upon displacement of said plunger against the biasing action of said resilient means, a capillary tube mounted within said casing, said capillary tube having one end extending into said chamber for communication with the chamber for the liquid body therein, and having the other end disposed on said casing for viewing, indicia carrying scale means disposed on said casing adjacent the said other end of said capillary tube for measuring the position of liquid at such other end, and second resilient means interposed between said sleeve and casing for normally biasing the lowermost portion of the sleeve to a position below the lowermost portion of the depending portion of the casing and thereby position the hardness testing element above the uppermost plane of the object the hardness of which is to be tested when the bottom of the sleeve rests on said object, said casing being manually displaceable downwardly relative to the sleeve against the biasing action of said last named resilient means for displacing said casing and therewith the hardness testing element on the plunger into contact with the object, the hardness of which is to be tested.*

*8. A compact testing device for testing the hardness of materials by surface penetration of materials, including the combination, with a hollow casing having a hollow depending portion provided with a downwardly directed opening, of a plunger vertically slidable in said depending portion of the casing, a hardness testing element secured to the lower end of said plunger and normally projecting through said opening, a coil spring in said casing having one end thereof operatively connected with said plunger for biasing said plunger towards said opening, a chamber for a body of liquid formed within the casing and extending transversely of said plunger, said chamber having a flexible diaphragm forming a lower wall thereof, said diaphragm being disposed in proximity to the upper end of said plunger and adapted to be deformed by said plunger upon displacement of said plunger against the biasing action thereon of said coil spring, a capillary tube mounted within said casing, said capillary tube having one end extending into said chamber for communication with the liquid body therein, and another end disposed on said casing for viewing, indicia carrying scale means adjacent the said other end of the capillary tube for measuring the position of fluid therein, a sleeve mounted exteriorly of said depending portion of said casing for relative sliding movement, means limiting the relative sliding movement of the sleeve and depending portion, whereby in one position of the sleeve the lower end of said sleeve projects beyond the normal inactive position of the hardness testing element of the plunger, and in another position of said sleeve said hardness testing element, under manual pressure applied to said casing, projects below the lower end of said sleeve, and a spring disposed between said casing and said sleeve for normally biasing the latter into its one position.*

*9. A compact testing device for testing the hardness of materials by surface penetration of materials, including the combination, with a hollow casing having a hollow depending portion provided with a downwardly directed opening, of a plunger vertically slidable in said depending portion of the casing, a hardness testing element secured to the lower end of said plunger and normally projecting through said opening, a coil spring in said casing having one end thereof operatively connected with said plunger for biasing said plunger towards said opening, a chamber for a body of liquid formed within the casing and extending transversely of said plunger, said chamber having a flexible diaphragm forming a lower wall thereof, said diaphragm being disposed in proximity to the upper end of said plunger having a substantially greater cross sectional area than, and adapted to be deformed by, said plunger upon displacement of said plunger against the biasing action thereon of said coil spring, a plate interposed between said diaphragm and said plunger and having opposing surfaces at all times in contact with each thereof, said plate being of lesser diameter than the diaphragm and of substantially greater diameter than the plunger whereby to provide an enlarged zone of deformation of the diaphragm by the plunger, a capillary tube mounted within said casing, said capillary tube having one end extending into said chamber for communication with the liquid body therein, and another end disposed on said casing for viewing, indicia carrying scale means adjacent the said other end of the capillary tube for measuring the position of fluid therein, a sleeve mounted exteriorly of said depending portion of said casing for relative sliding movement, means limiting the relative sliding movement of the sleeve and depending portion, whereby in one position of the sleeve the lower end of said sleeve projects beyond the normal inactive position of the hardness testing element of the plunger, and in another position of said sleeve said hardness testing element, under manual pressure applied to said casing, projects below the lower end of said sleeve, and a spring disposed between said casing and said sleeve for normally biasing the latter into its one position.*

ALFRED ERNST.

References Cited in the file of this patent or the original patent

UNITED STATES PATENTS

| Number | Name | Date |
|---|---|---|
| 269,796 | Kirk et al. | Dec. 26, 1882 |
| 1,125,236 | Whiting | Jan. 19, 1915 |
| 1,320,748 | Fisher | Nov. 4, 1919 |
| 1,381,288 | Davis | June 14, 1921 |
| 1,442,399 | Green | Jan. 16, 1923 |
| 1,569,097 | MacKenzie | Jan. 12, 1926 |
| 1,661,718 | Davis | Mar. 6, 1928 |
| 1,752,964 | Prange | Apr. 1, 1930 |
| 2,122,203 | Gogan | June 28, 1938 |
| 2,345,180 | Cook | Mar. 28, 1944 |
| 2,372,451 | Reason | Mar. 27, 1945 |
| 2,448,486 | Chester | Aug. 31, 1948 |

FOREIGN PATENTS

| Number | Country | Date |
|---|---|---|
| 239,978 | Switzerland | Mar. 1, 1946 |
| 248,851 | Switzerland | May 18, 1948 |